US012699625B2

(12) United States Patent
Sunny et al.

(10) Patent No.: US 12,699,625 B2
(45) Date of Patent: Aug. 4, 2026

(54) ERROR CORRECTION VIA ARTIFICIAL INTELLIGENCE

(71) Applicant: Micron Technology, Inc., Boise, ID (US)

(72) Inventors: Febin Sunny, Folsom, CA (US);
Poorna Kale, Folsom, CA (US);
Saideep Tiku, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 114 days.

(21) Appl. No.: 18/611,423

(22) Filed: Mar. 20, 2024

(65) Prior Publication Data

US 2024/0320090 A1     Sep. 26, 2024

Related U.S. Application Data

(60) Provisional application No. 63/454,249, filed on Mar. 23, 2023.

(51) Int. Cl.
*G06F 11/10* (2006.01)
(52) U.S. Cl.
CPC ................................ *G06F 11/1044* (2013.01)
(58) Field of Classification Search
None
See application file for complete search history.

(56) References Cited

U.S. PATENT DOCUMENTS

2020/0334461 A1* 10/2020 Rabinovich ........... A63F 13/213

FOREIGN PATENT DOCUMENTS

CN       110111416 A  *  8/2019  ............. G06T 17/00
CN       114373050 A  *  4/2022  ............. G06N 3/045

OTHER PUBLICATIONS

FT CNN: Algorithm Based Fault Tolerance for Convolutional Neural Networks (Zhao et al., 2020) (Year: 2020).*

* cited by examiner

*Primary Examiner* — Guerrier Merant
(74) *Attorney, Agent, or Firm* — Brooks, Cameron & Huebsch, PLLC

(57)     ABSTRACT

Apparatuses and methods related to error correction via artificial intelligence (AI) are described. An augmented reality (AR) display can be coupled to a memory device. AI circuitry coupled to the memory device can receive an error correction model. Prior to receipt of the error correction model by the AI circuitry, the error correction model can be trained, externally to the memory device and AI circuitry, to correct random errors introduced to execution of the AR AI workload in hazardous conditions. The AI circuitry can execute the model to perform error correction in association with execution of the AR AI workload.

11 Claims, 4 Drawing Sheets

250

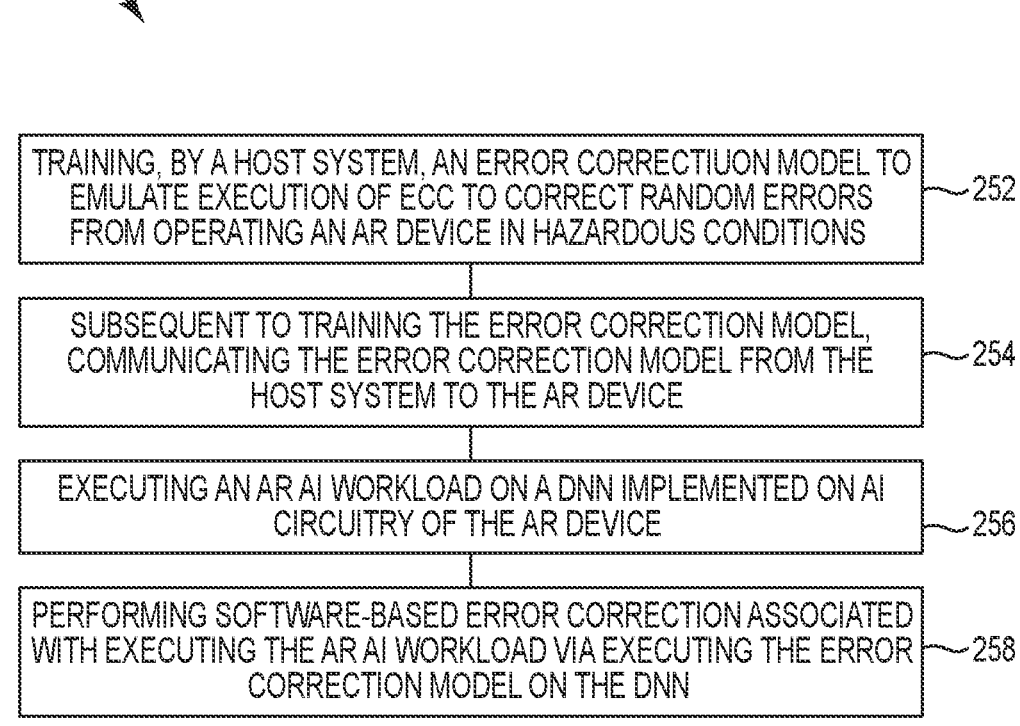

TRAINING, BY A HOST SYSTEM, AN ERROR CORRECTIUON MODEL TO EMULATE EXECUTION OF ECC TO CORRECT RANDOM ERRORS FROM OPERATING AN AR DEVICE IN HAZARDOUS CONDITIONS ~252

SUBSEQUENT TO TRAINING THE ERROR CORRECTION MODEL, COMMUNICATING THE ERROR CORRECTION MODEL FROM THE HOST SYSTEM TO THE AR DEVICE ~254

EXECUTING AN AR AI WORKLOAD ON A DNN IMPLEMENTED ON AI CIRCUITRY OF THE AR DEVICE ~256

PERFORMING SOFTWARE-BASED ERROR CORRECTION ASSOCIATED WITH EXECUTING THE AR AI WORKLOAD VIA EXECUTING THE ERROR CORRECTION MODEL ON THE DNN ~258

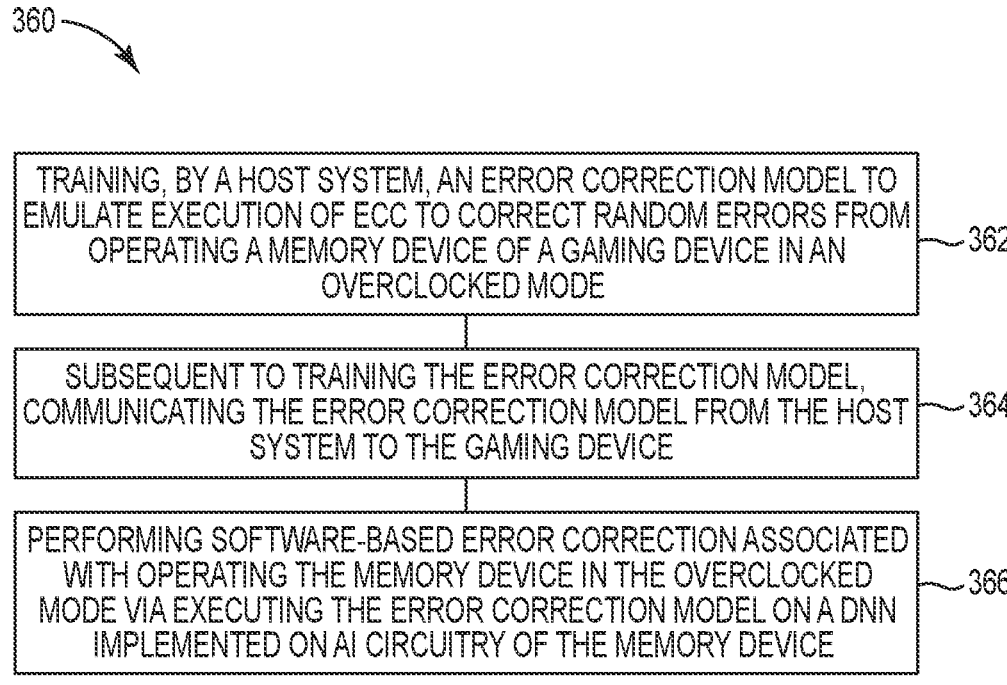

TRAINING, BY A HOST SYSTEM, AN ERROR CORRECTION MODEL TO EMULATE EXECUTION OF ECC TO CORRECT RANDOM ERRORS FROM OPERATING A MEMORY DEVICE OF A GAMING DEVICE IN AN OVERCLOCKED MODE ~362

SUBSEQUENT TO TRAINING THE ERROR CORRECTION MODEL, COMMUNICATING THE ERROR CORRECTION MODEL FROM THE HOST SYSTEM TO THE GAMING DEVICE ~364

PERFORMING SOFTWARE-BASED ERROR CORRECTION ASSOCIATED WITH OPERATING THE MEMORY DEVICE IN THE OVERCLOCKED MODE VIA EXECUTING THE ERROR CORRECTION MODEL ON A DNN IMPLEMENTED ON AI CIRCUITRY OF THE MEMORY DEVICE ~366

FIG. 3

ERROR CORRECTION VIA ARTIFICIAL INTELLIGENCE

PRIORITY INFORMATION

This application claims the benefits of U.S. Provisional Application No. 63/454,249, filed on Mar. 23, 2023, the contents of which are incorporated herein by reference.

TECHNICAL FIELD

The present disclosure relates generally to memory devices, and more particularly, to devices and methods related to error correction via artificial intelligence (AI).

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 2 illustrates an example of a method for error correction in hazardous conditions via AI in accordance with a number of embodiments of the present disclosure.

FIG. 3 illustrates an example of a method for error correction for overclocking via AI in accordance with a number of embodiments of the present disclosure.

DETAILED DESCRIPTION

Figure 1:
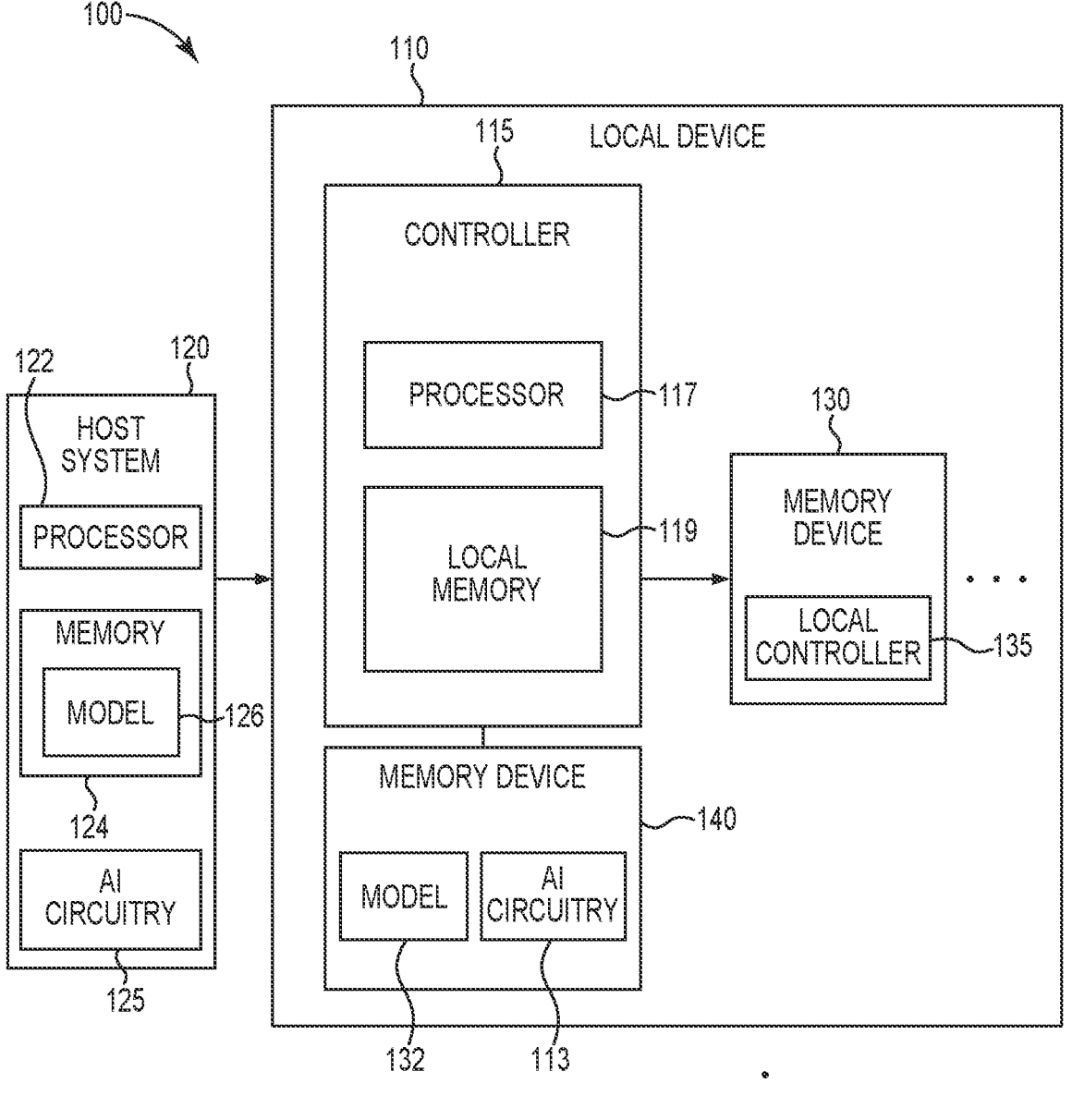
FIG. 1 illustrates an example computing system for error correction via artificial intelligence (AI) in accordance with some embodiments of the present disclosure.

The present disclosure includes apparatuses and methods related to error correction via artificial intelligence (AI). An AI workload (e.g., executing a model on AI circuitry) and/or overclocked memory (e.g., memory operating in an overclocked mode) can be particularly susceptible to random errors (e.g., random bit flips) because an AI workload or overclocked memory can push AI circuitry and memory to the edge of reliability. Hardware-based error correction (e.g., execution of error correction code (ECC)) may only correct a few errors (e.g., 1-2 flipped bits) per codeword. Execution of an AI workload can be affected environmental conditions, such as hazardous conditions, in which circuitry executing the AI workload operates. A non-limiting example of a hazardous condition can be radioactivity. Radiation can cause random errors (e.g., random bit flips) that ECC, for example, may not be able to account for and/or correct.

Some previous approaches to utilizing hardware-based error correction (e.g., via execution of ECC in the form of hardware circuitry) in hazardous and/or overclocking conditions may include memory sub-systems having additional (e.g., redundant) and/or specialized circuitry to compensate for effects associated with memory sub-system in hazardous conditions and/or at overclocking conditions. Although a robust memory output may be ensured by making use of memory redundancy and/or specialized error correction mechanisms, for example, such previous approaches lead to increases in hardware overheads and/or resource consumption such as increased size (e.g., die size), power, and energy. Such hardware overheads and/or resource consumption may be contrary to operation of a memory sub-system of a smart device that utilizes resources for processing and/or increasing processing capabilities of a memory sub-system of a smart device, for example.

Embodiments of the present disclosure address the above deficiencies and other deficiencies of previous approaches by utilizing software-based error correction, in addition to and/or instead of hardware-based error correction, to compensate for effects associated with operation of a memory sub-system, or a component thereof, in hazardous conditions and/or at overclocking. Embodiments of the present disclosure utilize AI circuitry to provide software-based error correction. For example, a neural network, implemented on AI circuitry of a memory sub-system, can execute a model (e.g., an error correction model) trained to provide error correction when the memory sub-system, or a component thereof, is in hazardous conditions and/or at overclocking. Some embodiments provide error correction capabilities similar to, or even improved relative to, that of memory redundancy and/or specialized error correction mechanisms of previous approaches. For example, software-based error correction described herein can correct multiple (e.g., more than two) bits in a set of data on which the software-based error correction is performed in contrast to hardware-based error correction that can only correct up to one or two bits with a single codeword.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 for error correction via AI in accordance with some embodiments of the present disclosure. The computing system 100 can include a host system 120 and a memory sub-system 110 can include media, such as one or more volatile memory devices (e.g., memory device 140), one or more non-volatile memory devices (e.g., memory device 130), or a combination of such.

The memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM). In some embodiments, the memory sub-system 110 is an augmented reality (AR) device, such as an AR display.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor 122 and a software stack (not shown) executed by the processing sub-system. The processor 122 can include one or more cores, one or more caches, a memory controller (e.g., NVDIMM controller), and a storage protocol controller (e.g., PCIe controller, SATA controller). The host system 120 can include a memory 124, in which an error correction model 126 can be stored. The host system 120 can be communicatively coupled (e.g., via a wireless interface) to the memory sub-system 110. The host system 120 can be distinct from the memory sub-system 110. In some embodiments, the host system 120 can be a cloud server, or a component thereof.

The host system 120 can be coupled to the memory sub-system 110 via an interface (e.g., a physical interface and/or a wireless interface). Examples of a physical interface can include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other physical interface. Examples of a wireless interface can include, but are not limited to, a cellular interface, a Wi-Fi interface, a Bluetooth interface, or any other wireless interface. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130 and 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., the memory device 130) include negative-and (NAND) type flash memory and write-in-place memory. NAND type flash memory includes, for example, two-dimensional NAND (2D NAND) and three-dimensional NAND (3D NAND).

Each of the memory devices 130 and/or the memory device 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EE-PROM).

A memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the memory sub-system 110 described in association with FIG. 1 includes the memory sub-system controller 115, in at least one embodiment of the present disclosure, the memory sub-system 110 does not include the memory sub-system controller 115 and can rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code operations, encryption operations, caching operations, and address translations between a logical address (e.g., logical block address (LBA), namespace) and a physical address (e.g., physical block address) that are associated with the memory devices 130. The memory sub-system controller 115 can further include host interface (not shown) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

From the perspective of a deep-learning execution pipeline, an error correction model (e.g., the model 126) can be stacked on to a topmost (input) layer of a vision-based deep learning model. For instance, a deep neural network (DNN) model, can be trained to emulate (e.g., act as) error correction circuitry of the memory sub-system 110 via input of weights of a vision-based model with errors (e.g., random bit flips). As a result, the trained DNN model can output a bit stream with the errors corrected.

In some embodiments, the host system 120 can train a model (e.g., the error correction model 126) to emulate execution of ECC to correct random errors from operating the memory sub-system 110 in hazardous conditions. The hazardous conditions can include a radioactive environment, such as subjecting the memory sub-system 110, or one or more components thereof, to at least one hundred gray (Gy). The host system 120 can train a model 126 (e.g., an error correction model) to emulate execution of ECC to correct random errors from operating the memory sub-system 110 in an overclocked mode. During training of the model 126, losses can be determined for backpropagation. The losses can be based on, for the same input data, the output of the model 126 and the output of executing ECC by the host system 120. The host system 120 can include AI circuitry 125 to train the model 126. The AI circuitry 125 can implement a DNN model. The memory sub-system 110 can be distinct from the host system 120.

In some embodiments, the host system 120 can include an error generator (not shown). The error generator can provide, in association with training the model 126, errors associated with one or more operating conditions associated with operating the memory device 140 in an overclocked mode and a type of the memory device 140 (e.g., DRAM). For instance, a DRAM-specific error generator can generate errors (e.g., random bitflips) and capture one or more characteristics and/or behaviors of the DRAM (e.g., the memory device 140) when operating under a heavy workload, such as high temperatures and/or overclocking. Such training of an error correction model using deep learning can be for one or more particular types of DRAM. Knowledge of the type of DRAM with which an error correction model is to be used can be beneficial in choosing and/or training the error correction model.

The operating conditions can include, but are not limited to, one or more temperatures and/or clock frequencies of the memory device 140 associated with operating the memory device 140 in an overclocked mode. In some embodiments, the memory sub-system 110 can be a component of a gaming system (e.g., a mobile gaming system) or an AR system. A gaming system or AR system, among others, may frequently operate memory devices, such as the memory device 140, in an overclocked mode to increase performance and data throughput.

The memory sub-system 110 includes AI circuitry 113. Although the AI circuitry 113 is illustrated as a component of the memory device 140, in some embodiments the AI circuitry 113 can be a different component of the memory sub-system 110, such as a component of the memory sub-system controller 115 and/or the memory device 130. AI circuitry can be configured to combine data using iterative processing and algorithms such that the AI circuitry learns from patterns and/or features in the data. A non-limiting example of AI circuitry can be a neural network. As used herein, "neural network" refers to software, hardware, or combinations thereof configured to process data in a manner similar to neurons of a human brain. Artificial neural networks can include various technologies such as deep learning and machine learning. As used herein, "machine learning" refers to an ability software, hardware, or combinations thereof to learn and improve from experience without improvements being explicitly programmed. As used herein, "deep learning" refers to machine learning methods based on artificial neural networks with representation learning (also referred to herein as DNNs), which can be supervised, semi-supervised or unsupervised. Deep learning can be a subset of AI. The low power, inexpensive design of deep learning accelerators (DLAs) can be implemented in internet-of-things (IoT) devices. The DLAs can process and make intelligent decisions at run-time. Memory devices including the edge DLAs can also be deployed in remote locations without cloud or offloading capability.

In some embodiments, the AI circuitry 113 can receive a model 132 (e.g., an error correction model) from the host system 120. The model 132 can be the model 125 or based on the model 125. The model 132 is trained, by the host system 120, to emulate execution of ECC of the memory sub-system 110. The AI circuitry 113 can be on-chip with a memory array (not shown) of the memory device 140 such that the memory device 140 comprises a system-on-chip (SoC). In some embodiments, the AI circuitry 113 can execute the trained model to perform software-based error correction instead of and/or in addition to hardware-based error correction of the memory sub-system 110.

Random errors can occur on the memory device 140 in response to operating the memory sub-system 110 in one or more hazardous conditions. In some embodiments, the AI circuitry 113 can execute the model 132 in response the memory sub-system 110, or one or more components thereof, operating in hazardous conditions. Execution of the model 132 provides software-based error correction. In some embodiments, execution of the trained model can provide software-based error correction in addition to hardware-based error correction of the memory sub-system 110. The software-based error correction via execution of the model 132 can be distinct from other error correction capabilities (e.g., execution of ECC) of the memory sub-system 110.

As described herein, random errors can occur on the memory device 140 in response to operating the memory device 140 in an overclocked mode. In some embodiments, the AI circuitry 113 can receive the model 132 (e.g., an error correction model) from the host system 120. The model 132 can be trained, by the host 120, to emulate execution of ECC of the memory sub-system 110. The AI circuitry 113 can execute the model 132 to perform software-based error correction instead of and/or in addition to hardware-based error correction of the memory sub-system 110 in response to the memory device 140 operating in an overclocked mode. The software-based error correction via execution of the model 132 can be distinct from other error correction capabilities (e.g., execution of ECC) of the memory sub-system 110.

Although not specifically illustrated by FIG. 1, in some embodiments, the memory sub-system 110 can be a component of an AR device, such as an AR display. In some embodiments, the AR display is a component of personal protection equipment (PPE), which can be worn in hazardous conditions. The AI circuitry 113 can execute an AI workload associated with an AR device (e.g., an AR display)

coupled to the memory sub-system 110 or of which the memory sub-system 110 is a component. Such an AI workload can be referred to herein as an AR AI workload. Execution of an AR AI workload by the AI circuitry 113, for example, can include, but is not limited to, executing a model associated with AR functions, such as overlaying information on images where the information is based on those images. Data corresponding to the images and/or the information can be stored on the memory device 140. Some embodiments include the AI circuitry 113 on-chip with the memory device 140 to facilitate communication of data from the memory device 140 to the AI circuitry 113, ands vice versa, via increased throughput and more direct access to the data as compared to the AI circuitry 113 being not on-chip with the memory device 140. In some embodiments, an error correction model can be trained such that inputting weights with random errors to an AR AI workload and executing the error correction model causes the AR AI workload to yield a same output as the AR AI workload would without the random errors.

FIG. 2 illustrates an example of a method 250 for error correction in hazardous conditions via AI in accordance with a number of embodiments of the present disclosure. The method 250 can be performed by AI circuitry, such as the AI circuitry 125 and/or the AI circuitry 113 and/or the host system 120 described in association with FIG. 1. The method 250 can be performed by processing logic that can include hardware (e.g., processing device, circuitry, dedicated logic, programmable logic, microcode, hardware of a device, integrated circuit, etc.), software (e.g., instructions run or executed on a processing device), or combinations thereof. One or more processes can be omitted in various embodiments. Thus, not all processes are required in every embodiment. Other process flows are possible.

At 252, the method 250 can include training, by a host system (e.g., the host system 120), an error correction model (e.g., the model 126) to emulate execution of ECC to correct random errors from operating a memory sub-system (e.g., the memory sub-system 110) of an AR device (e.g., an AR display) in hazardous conditions. At 254, the method 250 can include, subsequent to training the error correction model, communicating the error correction model from the host system to the AR device.

At 256, the method 250 can include executing an AR AI workload on a DNN implemented on AI circuitry of the AR device. At 258, the method 250 can include performing software-based error correction associated with executing the AR AI workload via executing the error correction model (e.g., the model 132) on the DNN. Executing the AR AI workload can include executing a vision-based AI model to perform an AR function. Performing the software-based error correction can include executing the error correction model to emulate execution of the ECC to correct random errors introduced to execution of the vision-based AI model by the hazardous conditions.

Although not specifically illustrated, the method 250 can include, responsive to operating the AR device in non-hazardous conditions, performing hardware-based error correction via associated with the memory device via error correction circuitry of the AR device. The method 250 can include, responsive to operating the AR device in the hazardous conditions subsequent to operating the AR device in the non-hazardous conditions, switching from performing hardware-based error correction to performing software-based error correction. The method 250 can include, responsive to operating the AR device in the non-hazardous conditions subsequent to operating the AR device in the hazardous conditions, switching from performing software-based error correction to performing hardware-based error correction.

FIG. 3 illustrates an example of a method 360 for error correction for overclocking via AI in accordance with a number of embodiments of the present disclosure. The method 360 can be performed by AI circuitry, such as the AI circuitry 125 and/or the AI circuitry 113 and/or the host system 120 described in association with FIG. 1. The method 360 can be performed by processing logic that can include hardware (e.g., processing device, circuitry, dedicated logic, programmable logic, microcode, hardware of a device, integrated circuit, etc.), software (e.g., instructions run or executed on a processing device), or combinations thereof. One or more processes can be omitted in various embodiments. Thus, not all processes are required in every embodiment. Other process flows are possible.

At 362, the method 360 can include training, by a host system (e.g., the host system 120), an error correction model (e.g., the model 126) to emulate execution of ECC to correct random errors from operating a memory device (e.g., the memory device 140) of a gaming device in an overclocked mode. At 364, the method 360 can include subsequent to training the error correction model, communicating the error correction model from the host system to the gaming device. At 366, the method 360 can include performing software-based error correction associated with operating the memory device in the overclocked mode via executing the error correction model (e.g., the model 132) on a DNN implemented on AI circuitry of the memory device.

Although not specifically illustrated, the method 360 can include, responsive to operating the memory sub-system in a non-overclocked mode, performing hardware-based error correction associated with the memory device via error correction circuitry of the gaming device. The method 360 can include, responsive to operating the memory device in the overclocked mode subsequent to operating the memory device in the non-overclocked mode, switching from performing the hardware-based error correction to performing the software-based error correction. The method 360 can include, responsive to operating the memory device in the non-overclocked mode subsequent to operating the memory device in the overclocked mode, switching from performing the software-based error correction to performing the hardware-based error correction.

Figure 4:
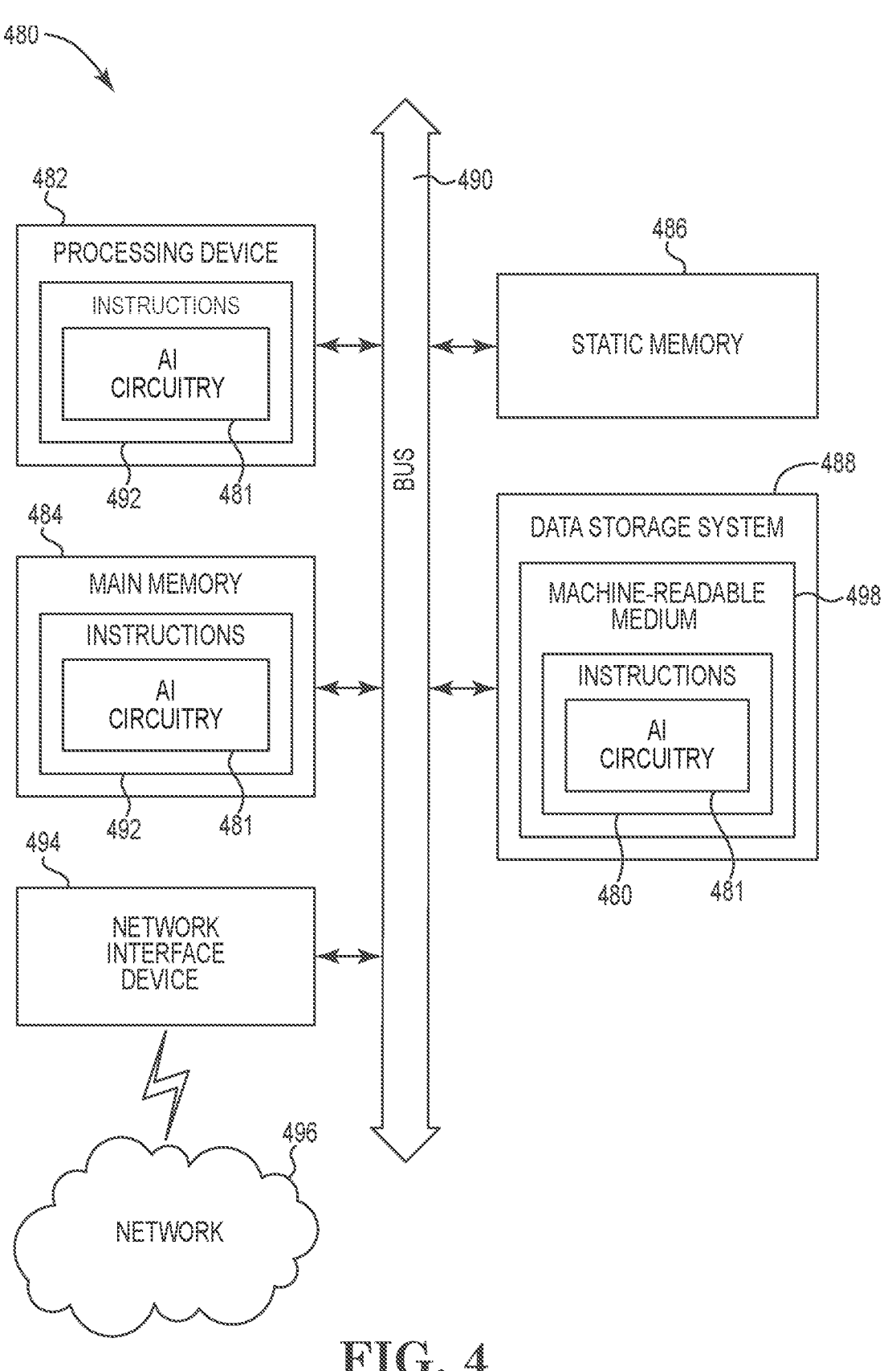
FIG. 4 illustrates an example machine of a computer system within which a set of instructions, for causing the machine to perform any one or more of the methodologies discussed herein, can be executed.

FIG. 4 illustrates an example machine of a computer system 480 within which a set of instructions, for causing the machine to perform any one or more of the methodologies discussed herein, can be executed. In some embodiments, the computer system 480 can correspond to a host system (e.g., the host system 120 described in association with FIG. 1) that includes, is coupled to, or utilizes a memory sub-system (e.g., the memory sub-system 110) or can be used to perform the operations of a controller (e.g., to execute an operating system to perform operations corresponding to the AI circuitry 125 and/or the AI circuitry 113). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a gaming device, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 480 includes a processing device 482, a main memory 484 (e.g., read-only memory (ROM), flash memory, dynamic random access memory (DRAM) such as synchronous DRAM (SDRAM) or Rambus DRAM (RDRAM), etc.), a static memory 486 (e.g., flash memory, static random access memory (SRAM), etc.), and a data storage system 488, which communicate with each other via a bus 490.

The processing device 482 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 482 can also be one or more special-purpose processing devices such as an application specific integrated circuit (ASIC), a field programmable gate array (FPGA), a digital signal processor (DSP), network processor, or the like. The processing device 482 is configured to execute instructions 492 for performing the operations and steps discussed herein. The computer system 480 can further include a network interface device 494 to communicate over the network 496.

The data storage system 488 can include a machine-readable storage medium 498 (also known as a computer-readable medium) on which is stored one or more sets of instructions 492 or software embodying any one or more of the methodologies or functions described herein. The instructions 492 can also reside, completely or at least partially, within the main memory 484 and/or within the processing device 482 during execution thereof by the computer system 480, the main memory 484 and the processing device 482 also constituting machine-readable storage media. The machine-readable storage medium 498, data storage system 488, and/or main memory 484 can correspond to the memory sub-system 110.

In some embodiments, the instructions 492 can include instructions to implement functionality corresponding to AI circuitry (e.g., the AI circuitry 125, the AI circuitry 113) executable by a processing device (e.g., the processing device 482). In some embodiments, the instructions 492 can include instructions to, responsive to an AR device including a memory device and a DLA coupled thereto operating in hazardous conditions, perform software-based error correction via execution of a model on the DLA. The hazardous conditions causes random errors to occur in the memory device. The hazardous conditions can include subjecting to the AR device to at least one hundred Gy of radiation and/or at least 100 degrees Celsius (° C.), for example.

In some embodiments, the instructions 492 can include instructions to, responsive to a memory device operating in an overclocked mode, perform software-based error correction via execution of a model on a DLA coupled to the memory device. The model emulates execution of ECC by the memory device and/or error correction circuitry coupled thereto. The instructions 492 can include instructions to train the model prior to operating the memory device in the overclocked mode. The instructions 492 can include instructions to execute the model to correct random errors associated with a temperature and/or a clock frequency associated with operating the memory device in the overclocked mode. The instructions 492 can include instructions to execute the model to correct errors associated with operating the memory device in the non-overclocked mode.

While the machine-readable storage medium 498 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device;
an augmented reality (AR) display coupled to the memory device; and
artificial intelligence (AI) circuitry coupled to the memory device and configured to:
execute an AR AI workload associated with the AR display;
receive an error correction model that emulates execution of error correction code (ECC),
wherein the error correction model is trained by a host system to correct random errors introduced to execution of the AR AI workload in hazardous conditions via inputting a plurality of weights of the AR AI workload with random errors; and execute the trained error correction model as a layer of the AR AI workload, to perform software-based error correction.

2. The apparatus of claim 1, wherein the error correction model is trained such that inputting the plurality of weights with random errors to the AR AI workload and executing the error correction model causes the AR AI workload to yield a same output as the AR AI workload would without the random errors,
wherein the plurality of weights comprise weights of an untrained error correction model.

3. The apparatus of claim 1, wherein the error correction via execution of the error correction model as a layer of the AR AI workload is carried out subsequent to execution of ECC by the memory device.

4. The apparatus of claim 1, wherein the memory device comprises dynamic random access memory (DRAM); and
wherein the AI circuitry comprises a deep learning accelerator (DLA).

5. The apparatus of claim 1, wherein the memory device comprises a memory array on-chip with the AI circuitry such that the memory device comprises a system-on-chip (SoC).

6. The apparatus of claim 1, wherein the AR display comprises a component of personal protection equipment (PPE); and
wherein the hazardous conditions comprise a radioactive environment.

7. A method, comprising training, by a host system, an error correction model to emulate execution of error correction code (ECC) to correct random errors from operating an augmented reality (AR) device in hazardous conditions via input of weights of an AR artificial intelligence (AI) workload with errors;
subsequent to training the error correction model, communicating the error correction model from the host system to the AR device;
executing the AR AI workload on a deep neural network (DNN) implemented on AI circuitry of the AR device; and
performing software-based error correction associated with executing the AR AI workload via executing the error correction model on the DNN.

8. The method of claim 7, wherein executing the AR AI workload comprises executing a vision-based AI model to perform an AR function; and
wherein performing the software-based error correction comprises executing the error correction model to emulate execution of the ECC to correct random errors introduced to execution of the vision-based AI model by the hazardous conditions.

9. The method of claim 7, further comprising, responsive to operating the AR device in non-hazardous conditions, performing hardware-based error correction associated with executing the AR AI workload via error correction circuitry of the AR device.

10. The method of claim 9, further comprising, responsive to operating the AR device in the hazardous conditions subsequent to operating the AR device in the non-hazardous conditions, switching from performing the hardware-based error correction to performing the software-based error correction.

11. The method of claim 10, further comprising, responsive to operating the AR device in the non-hazardous conditions subsequent to operating the AR device in the hazardous conditions, switching from performing the software-based error correction to performing the hardware-based error correction.

* * * * *